United States Patent
Ionescu

(10) Patent No.: US 12,445,083 B2
(45) Date of Patent: Oct. 14, 2025

(54) SYSTEM AND METHOD FOR DETERMINING AND UTILIZING TIME CONSTANTS FOR A VARIABLE FREQUENCY DRIVE

(71) Applicant: Innomotics GmbH, Nuremberg (DE)

(72) Inventor: Bogdan Cristian Ionescu, Carlsbad, CA (US)

(73) Assignee: Innomotics GmbH, Nuremberg (DE)

( * ) Notice: Subject to any disclaimer, the term of this patent is extended or adjusted under 35 U.S.C. 154(b) by 167 days.

(21) Appl. No.: 18/505,167

(22) Filed: Nov. 9, 2023

(65) Prior Publication Data

US 2025/0158556 A1     May 15, 2025

(51) Int. Cl.
*H02P 29/68* (2016.01)

(52) U.S. Cl.
CPC .................................. *H02P 29/68* (2016.02)

(58) Field of Classification Search
CPC ........ H02M 7/043; H02M 3/22; H02M 1/327; H02M 7/49; H02M 7/4835; H02M 5/10; H02M 7/4807; H02M 2001/327; H02M 2007/42; H02M 1/32; H02P 29/68; H02P 29/60; H02P 29/64; H02P 27/04; H02P 27/047; H02P 27/06; H02P 27/08; H02P 23/28; H02P 23/07; H02P 11/06; H02P 1/426; H02P 27/14; H02P 29/02
See application file for complete search history.

(56) References Cited

U.S. PATENT DOCUMENTS

| | | | |
|---|---|---|---|
| 2014/0210431 A1 | 7/2014 | Rastogi et al. | |
| 2022/0060134 A1 | 2/2022 | Ionescu | |
| 2022/0085713 A1* | 3/2022 | Clements | H02M 7/483 |
| 2022/0299377 A1 | 9/2022 | Hino et al. | |
| 2022/0385208 A1 | 12/2022 | Matsuoka et al. | |

FOREIGN PATENT DOCUMENTS

EP     4116793 A1     1/2023

\* cited by examiner

*Primary Examiner* — Antony M Paul
(74) *Attorney, Agent, or Firm* — Henry Feiereisen, LLC.

(57) ABSTRACT

A variable frequency drive system includes a power converter with a plurality of power cells supplying power to one or more output phases, each power cell having multiple switching devices, a plurality of sensors monitoring values of the power converter, and a control system in communication with the power converter and controlling operation of the plurality of power cells, wherein the control system is configured via computer executable instructions to access and utilize a multi-dimensional response surface to obtain an internal coolant flow rate.

20 Claims, 11 Drawing Sheets

SYSTEM AND METHOD FOR DETERMINING AND UTILIZING TIME CONSTANTS FOR A VARIABLE FREQUENCY DRIVE

BACKGROUND

1. Field

Aspects of the present disclosure relate to a variable frequency drive, also referred to as VFD, that is powered by an electric motor, driving a load such as pump, compressor, fan, or reciprocating compressor system etc. Throughout the specification, the terms "drive", "drive system", "multilevel power converter", "converter", "power supply" and "variable frequency drive (VFD)" can be used interchangeably.

2. Description of the Related Art

Examples of variable frequency drives include medium voltage (MV) variable frequency drives, such as for example multilevel power converters, which are used in applications of medium voltage alternating current (AC) drives, flexible AC transmission systems (FACTS), and High Voltage DC (HVDC) transmission systems, because single power semiconductor devices are not rated for high voltage. Multilevel power converters typically include a plurality of power cells for each phase, each power cell including an inverter circuit having semiconductor switches that can alter the voltage output of the individual cells. One example of a multilevel power converter is a cascaded H-bridge converter system having a plurality of H-bridge cells as described for example in U.S. Pat. No. 5,625,545 to Hammond. However, it should be noted that the herein described system(s) and method(s) can be applied to any drive system/converter, including but not limited to low voltage or medium voltage converters, and to single converters or multi-converter systems.

SUMMARY

Aspects of the present disclosure generally relate to a variable frequency drive, in connection with determining and utilizing time constants for one or more components or devices of the variable frequency drive. The methodology disclosed herein can be used for evaluation of various selected elements (outputs) in a drive system, such as power cell outputs (temperatures), power transformer windings temperatures, and electric machine outputs of interest, such as winding temperatures.

A first aspect of the present disclosure provides a variable frequency drive (VFD) comprising a power converter comprising a plurality of power cells supplying power to one or more output phases, each power cell comprising multiple switching devices, a plurality of sensors monitoring values of the power converter, a control system in communication with the power converter and controlling operation of the plurality of power cells, and a memory storing one or more time constant(s), wherein the control system is configured via computer executable instructions to determine transient temperature behavior utilizing the time constant(s).

A second aspect of the present disclosure provides a method for determining and utilizing a time constant in connection with a variable frequency drive (VFD), the method comprising, through operation of at least one processor, creating transient waveforms of a device of the VFD, extracting a time constant from the transient waveforms, and saving the time constant and the multi-dimensional RS in a memory of the VFD.

DETAILED DESCRIPTION

To facilitate an understanding of embodiments, principles, and features of the present disclosure, they are explained hereinafter with reference to implementation in illustrative embodiments. In particular, they are described in the context of systems and methods for determining and utilizing time constants in connection with a VFD.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
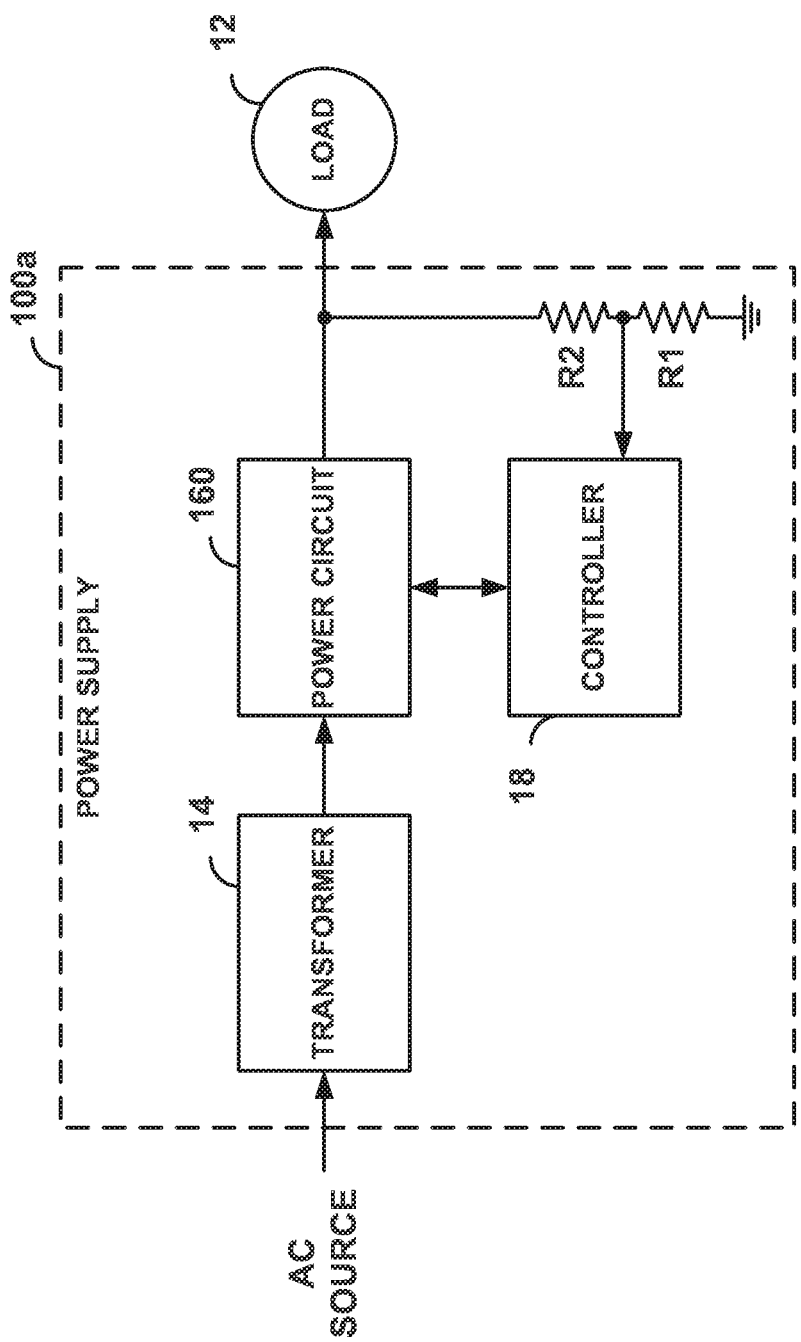
FIG. 1 illustrates a block diagram of an example multi-cell power supply in accordance with an exemplary embodiment of the present disclosure.

With reference to FIG. 1, an example multi-cell power supply 100*a* includes a transformer 14, a power circuit (herein also referred to as power converter) 160, a controller 18 and feedback resistors R1 and R2. The power supply 100*a* provides output power to a load 12.

Figure 2A:
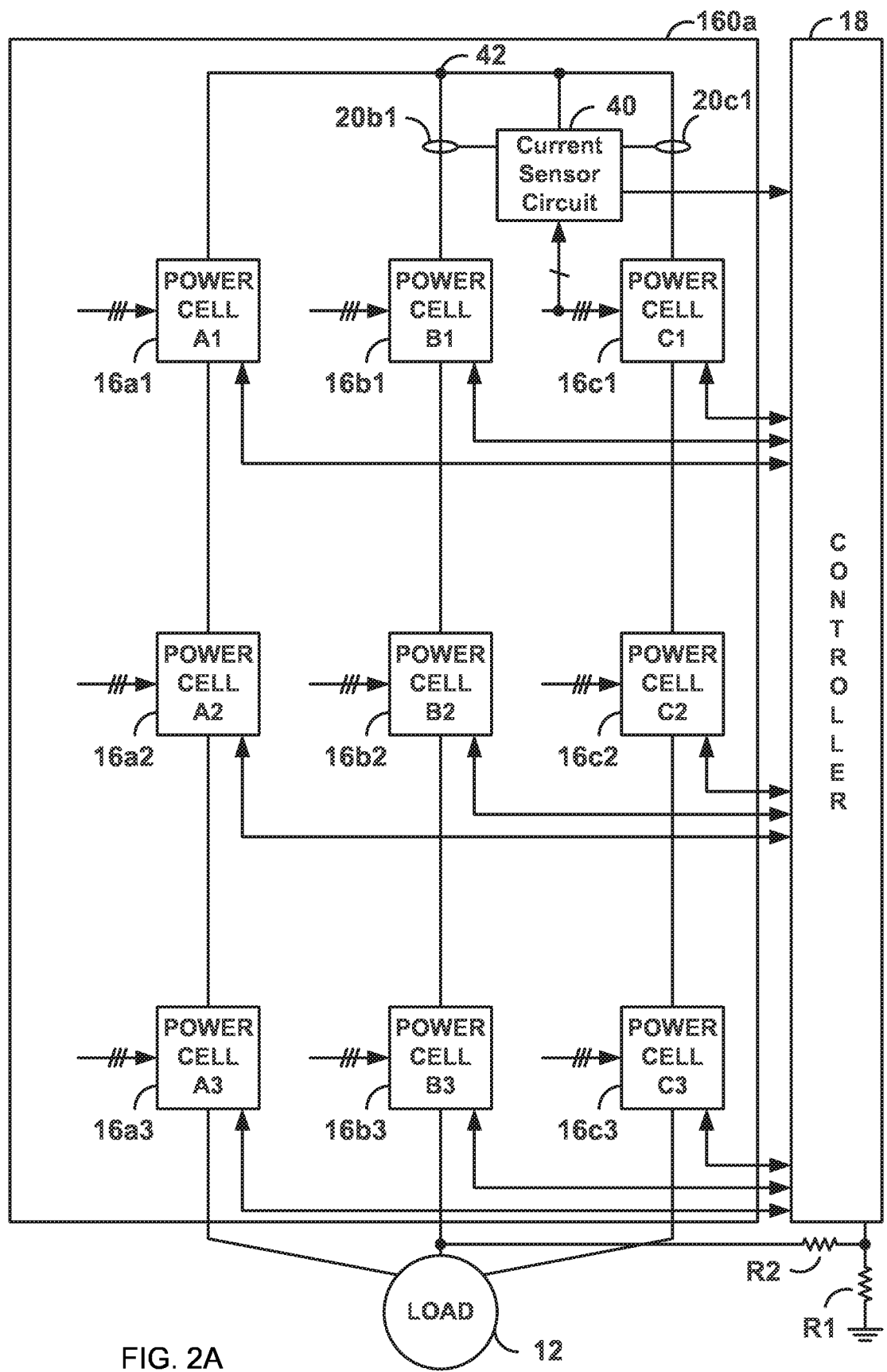
FIG. 2A illustrates a block diagram of an example power circuit of the multi-cell power supply of FIG. 1 in accordance with an exemplary embodiment of the present disclosure.

Referring now to FIG. 2A, an example embodiment of the power circuit 160 is described. Power circuit 160a includes nine power cells 16a1, 16b1, ..., 16c3 that are coupled to the transformer 14 (to avoid obscuring the drawing, transformer 14 is not shown) and are coupled via communication links to the controller 18. Persons of ordinary skill in the art will understand that more or less than nine power cells 16a1, 16b1, ..., 16c3 may be used.

Each output phase of power circuit 160a is fed by a group of series-connected power cells 16a1, 16b1, ..., 16c3. Power cells 16a1, 16a2 and 16a3 are coupled in a first phase group, power cells 16b1, 16b2 and 16b3 are coupled in a second phase group, and power cells 16c1, 16c2 and 16c3 are coupled in a third phase group, with the three phase groups joined in a WYE connection at reference node 42. Persons of ordinary skill in the art will understand that more or less than three output phases may be used.

The power circuit 160a also includes a current sensing circuit 40 that is coupled to current sensors 20b1 and 20c1, power cell 16c1, controller 18 and reference node 42. Current sensors 20b1 and 20c1 may be conventional current sensors. Current sensors 20b1 and 20c1 are adjacent reference node 42, and each have power terminals p and provide a measurement output signal at output terminal m.

Figure 3A:
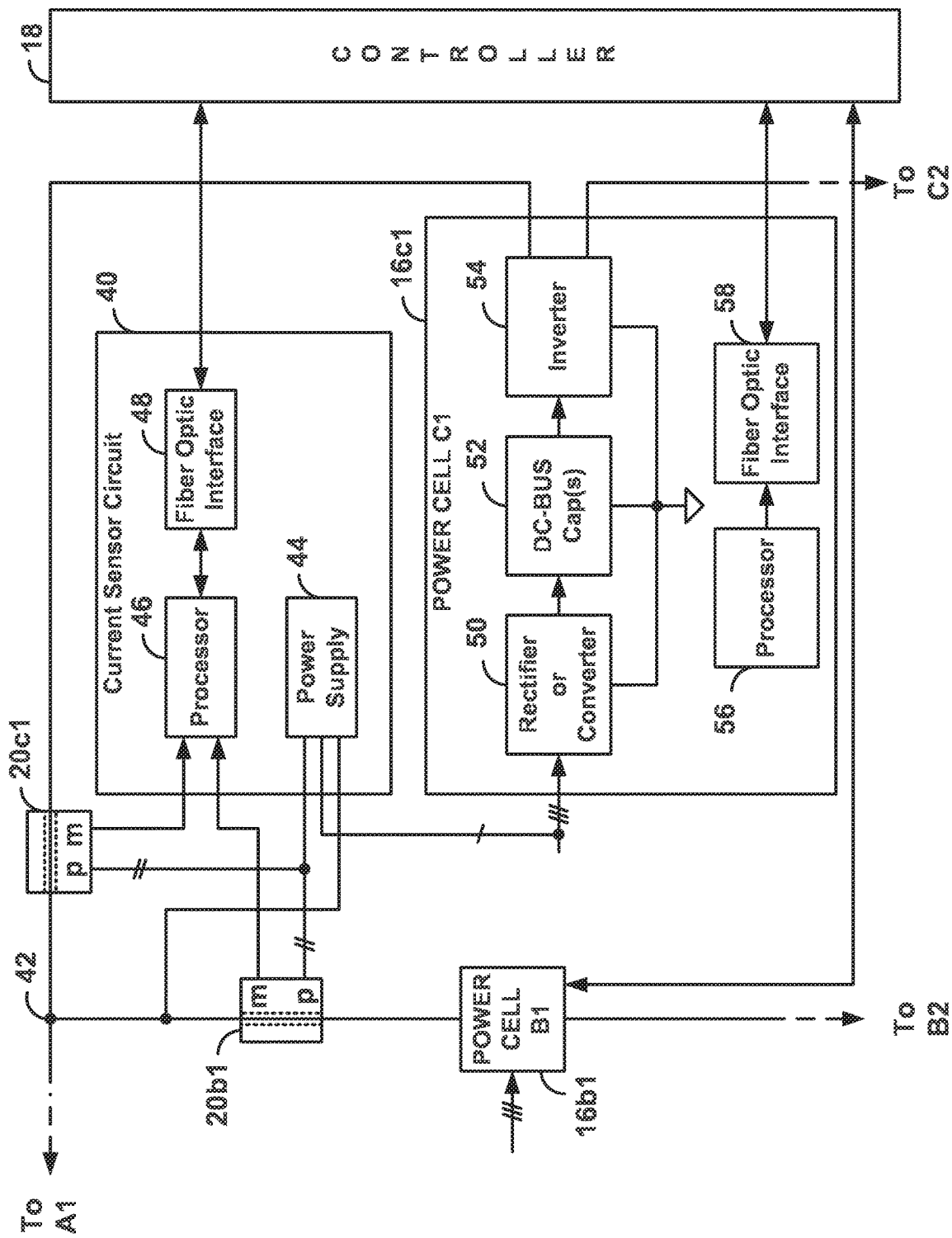
FIG. 3A illustrates a block diagram of an example current sensor circuit and power cell of the multi-cell power supply of FIG. 1 in accordance with an exemplary embodiment of the present disclosure.

Referring now to FIG. 3A, an example current sensor circuit 40 is described. The current sensor circuit 40 includes a power supply 44, a processor 46 and a fiber optic interface 48. Power supply 44 includes a first input signal coupled to one or more phases of the three-phase input to power cell 16c1, and a second input signal coupled to reference node 42, and provides power (e.g., +15 VDC) to power terminals p of current sensors 20b1 and 20c1. Power supply 44 may be any conventional AC-DC converter or other similar power supply.

Processor 46 has input terminals coupled to output terminals m of current sensors 20b1 and 20c1 and has an output terminal coupled to fiber optic interface 48. Processor 46 provides the measured output signals from current sensors 20b1 and 20c1 to controller 18 via fiber optic interface 48. Processor 46 may be a microprocessor, a Programmable Gate Array device (such as FPGA) that can be configured to perform the functions of a processor, an op-amp based circuit with a V/f converter to transmit the sensed feedback over fiber-optics, or other similar processor or circuit. Fiber optic interface 48 is coupled between processor 46 and controller 18 and provides electrical isolation between current sensor circuit 40 and controller 18.

Power cell 16c1 may be a conventional power cell that includes a rectifier 50, DC bus capacitor(s) 52, an inverter 54, a processor 56, and a fiber optic interface 58. Rectifier 50 converts the three-phase input AC signal to a substantially constant DC voltage coupled to DC bus capacitor(s) 52. Inverter 54 converts the DC voltage across DC bus capacitor(s) 52 to an AC output.

Rectifier 50, DC bus capacitor(s) 52, and inverter 54 have a common floating ground node. A first output terminal of power cell 16c1 is coupled to reference node (WYE connection) 42, and a second output terminal of power cell 16c1 is coupled to power cell 16c2. Processor 56 may be coupled to controller 18 via fiber optic interface 58. Processor 56 may communicate status information regarding power cell 16c1 to controller 18, and controller 18 may communicate control signals to processor 56 to control operation of power cell 16cl.

Figure 2B:
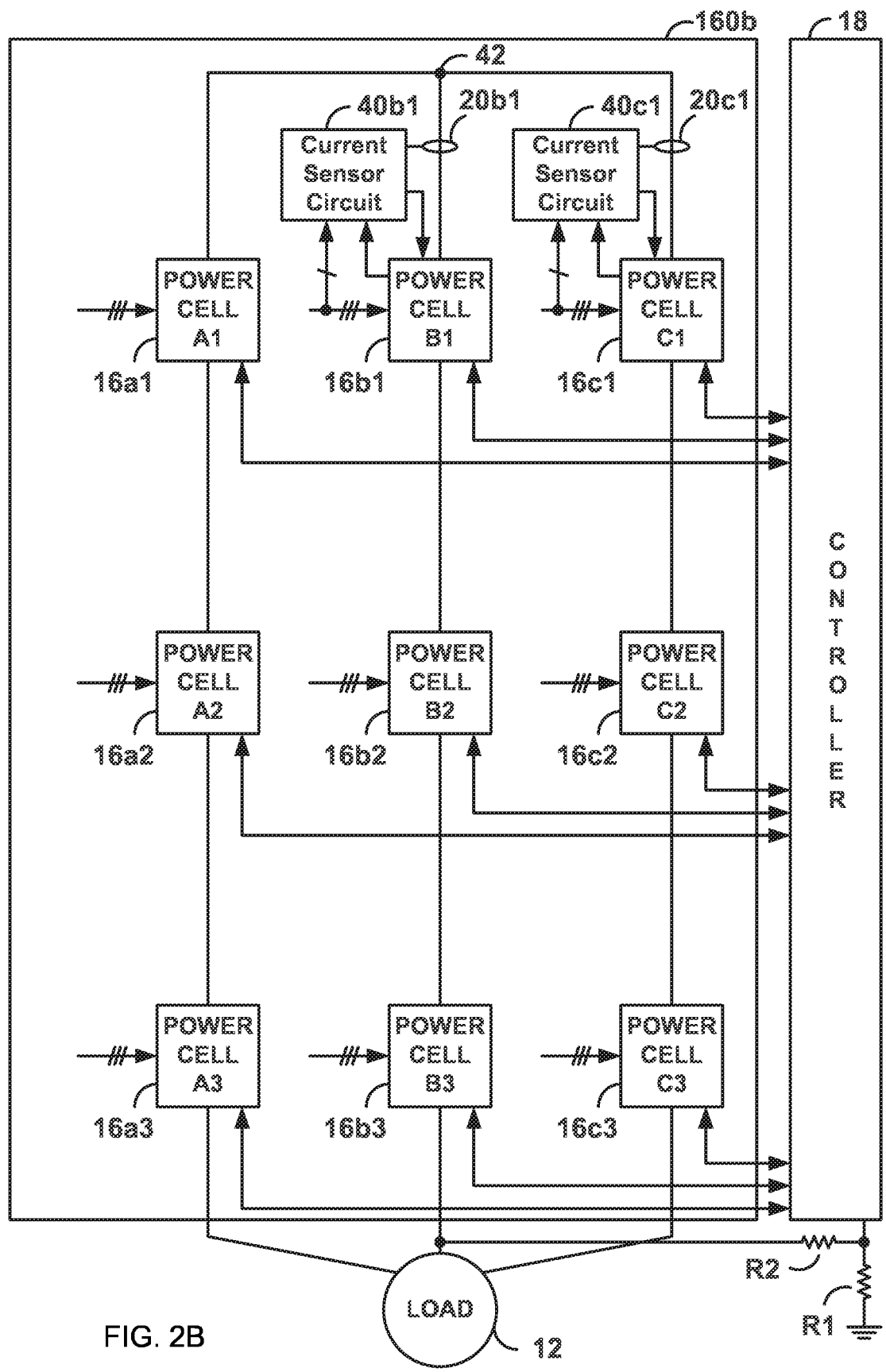
FIG. 2B illustrates a block diagram of an alternative example power circuit of the multi-cell power supply of FIG. 1 in accordance with an exemplary embodiment of the present disclosure.

Current sensor 20b1 is coupled between the first output terminal of power cell 16b1 and reference node 42, current sensor 20c1 is coupled between the first output terminal of power cell 16c1 and reference node 42, and power supply 44 is coupled to reference node 42. This equalizes the isolation voltage stress on current sensors 20b1, 20c1. Referring now to FIG. 2B, an alternative example embodiment of power circuit 160 is described. Power circuit 160b includes a first current sensor circuit 40b1 coupled to current sensor 20b1 and power cell 16b1, and a second current sensor circuit 40c1 coupled to current sensor 20c1 and power cell 16c1. In this regard, each of current sensors 20b1 and 20c1 is powered by the source supplying the corresponding power cell and measures an output current of power cells 16b1 and 16c1, respectively.

Figure 3B:
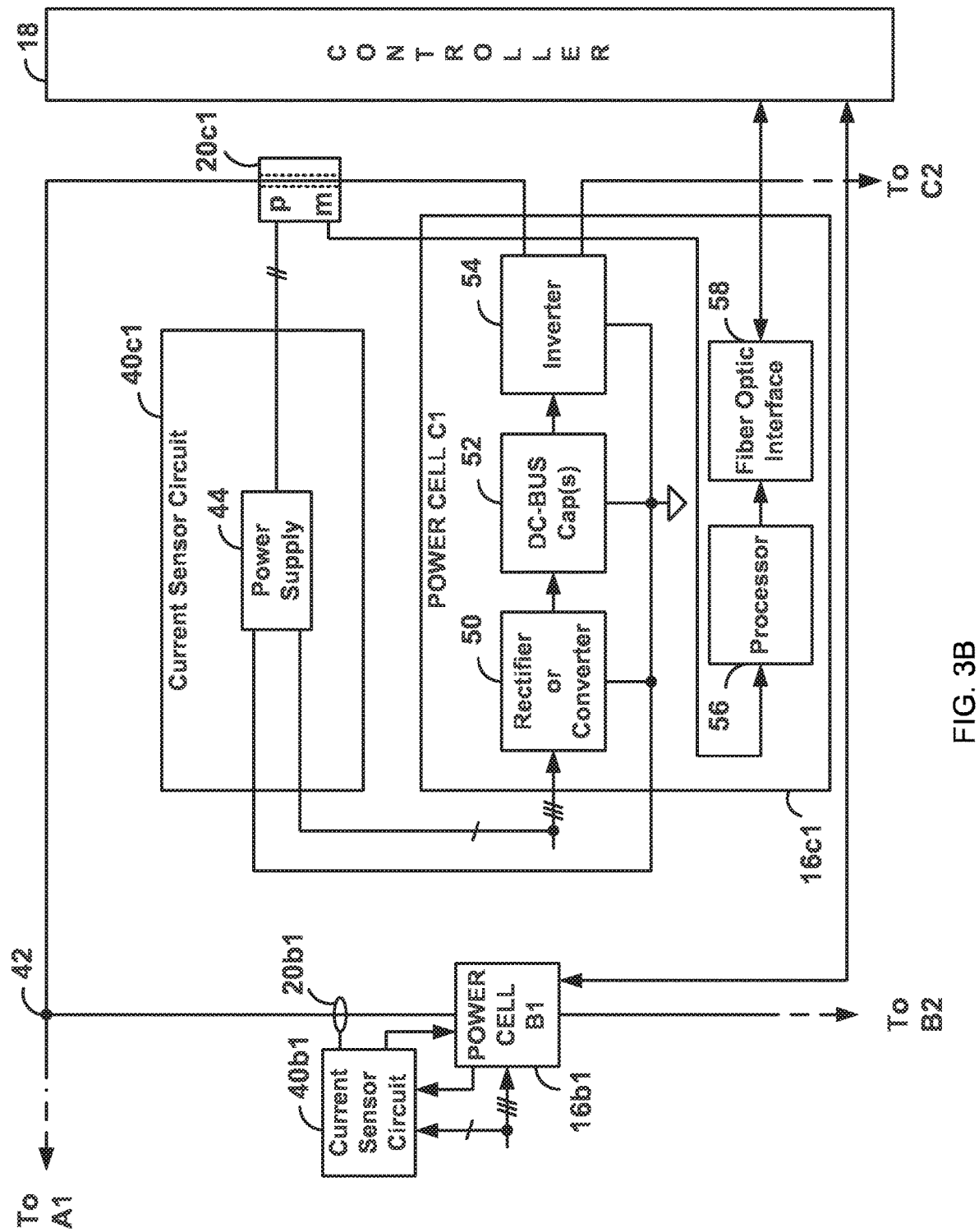
FIG. 3B illustrates a block diagram of an alternative example current sensor circuit and power cell of the multi-cell power supply of FIG. 1 in accordance with an exemplary embodiment of the present disclosure.

Referring now to FIG. 3B, an example current sensor circuit 40c1 is described. Current sensor circuit 40c1 includes power supply 44, which has a first input signal coupled to one or more phases of the three-phase input to power cell 16c1, a second input signal coupled to the floating ground of power cell 16c1, and provides power (e.g., +15 VDC) to power terminals p of current sensor 20c1. Output terminal m of current sensor 20c1 is coupled to an input terminal of processor 56 of power cell 16cl.

Processor 56 provides the measured output signal from current sensor 20c1 to controller 18 via fiber optic interface 58. In this regard, second current sensor circuit 40c1 does not require its own dedicated processor and fiber optic link, but instead uses the existing processor 56 and fiber optic link 58 of power cell 16c1 to communicate the measured output signal of current sensor 20c1 to controller 18. Although not shown in FIG. 3B, first current sensor circuit 40b1 may be the same as second current sensor circuit 40c1 and may use the processor and fiber optic link of power cell 16b1 to communicate the measured output signal of current sensor 20b1 to controller 18. The isolation requirement for each of current sensors 20b1 and 20c1 in FIG. 2B equals the rated output voltage of power cells 16b1 and 16c1, respectively.

Current sensor 20b1 measures an output current of power cell 16b1, and current sensor 20c1 measures an output current of power cell 16c1. The measured output current of power cell 16b1 substantially equals the "b" phase output current of power circuit 160b, and the measured output current of power cell 16c1 substantially equals the "c" phase output current of power circuit 160a. Thus, power cells 16b1 and 16c1 provide current feedback to controller 18 without requiring high voltage isolation corresponding to the rated voltage of the power circuit.

Figure 2C:
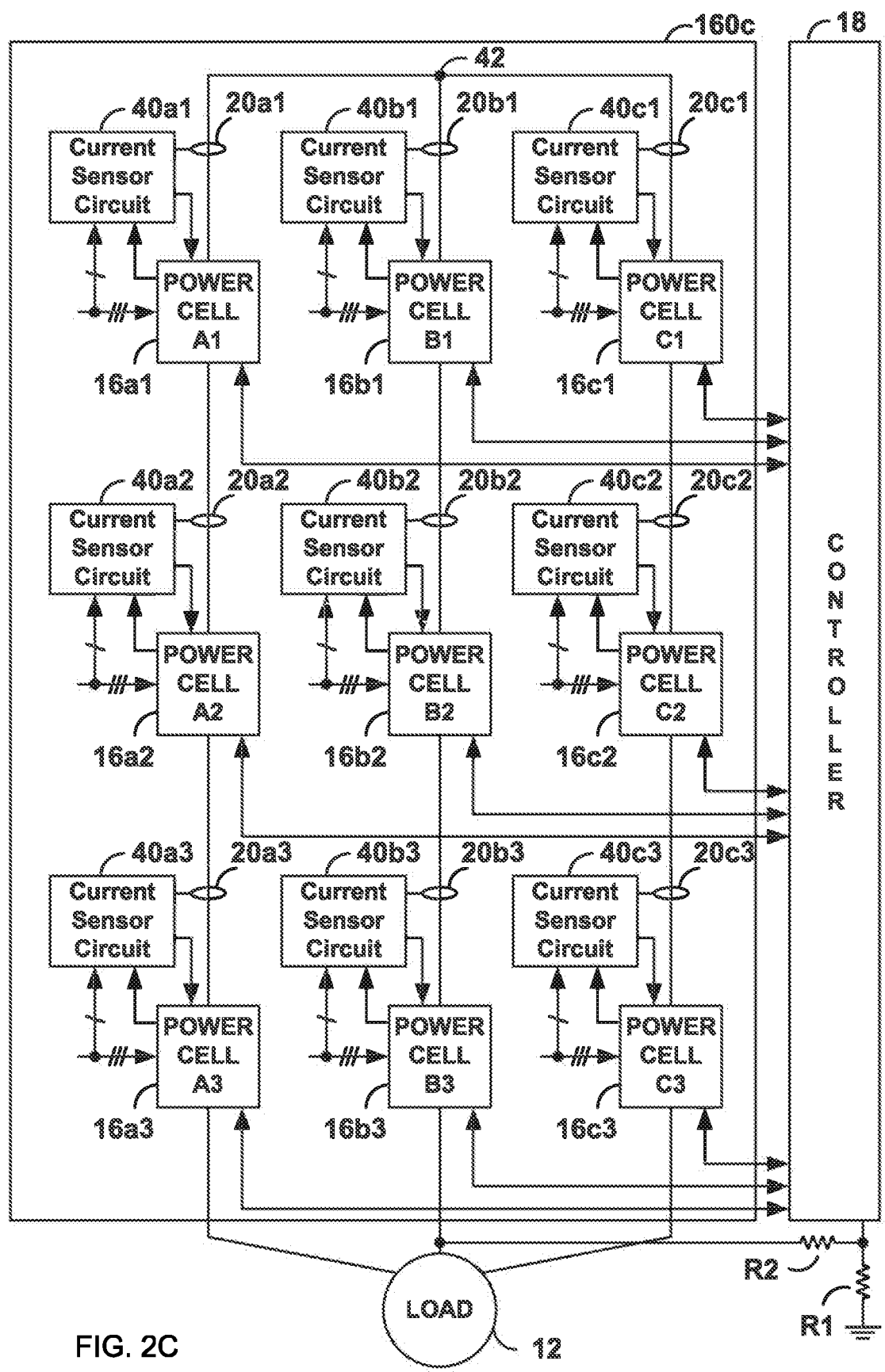
FIG. 2C illustrates a block diagram of another alternative example power circuit of the multi-cell power supply of FIG. 1 in accordance with an exemplary embodiment of the present disclosure.

Power cells in accordance with this disclosure may include more than two current sensors. For example, referring now to FIG. 2C, another alternative example embodiment of power circuit 160 is described. Specifically, power circuit 160c includes current sensor circuits 40a1, 40b1, ..., 40b3, 40c3 coupled to corresponding power cells 16a1, 16b1, ..., 16b3, 16c3, respectively, and corresponding current sensors 20a1, 20b1, ..., 20b3, 20c3, respectively. In this regard, each current sensor 20a1, 20b1, ..., 20b3, 20c3 is powered by and measures an output current of corresponding power cells 16a1, 16b1, ..., 16b3, 16c3, respectively. In addition, power cells 16a1, 16b1, ..., 16b3, 16c3 are used to communicate the measured output signals of corresponding current sensors 20a1, 20b1, ..., 20b3, 20c3, respectively, to controller 18. Such a configuration may be used to provide redundancy for current sensing. As in the embodiments of FIG. 2A and FIG. 2B, the isolation requirement for each of current sensors 20a1, 20b1, ..., 20b3, 20c3 in FIG. 3C equals the rated output voltage of corresponding power cells 16a1, 16b1, ..., 16b3, 16c3, respectively (e. g., 480V). Persons of ordinary skill in the art will understand that separate current sensors 20a1, 20b1, . . . , 20b3, 20c3 and current sensor circuits 40a1, 40b1, . . . , 40b3, 40c3 may be used with all or fewer than all of power cells power cells 16a1, 16b1, . . . , 16b3, 16c3 depending on the amount of redundancy desired.

Figure 4:
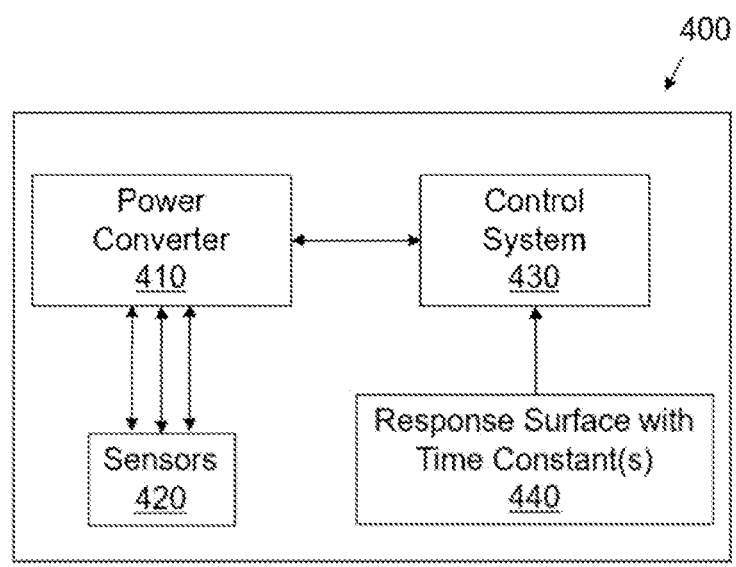
FIG. 4 illustrates a simplified block diagram of a power supply in connection with a response surface (RS) in accordance with an exemplary embodiment of the present disclosure.

FIG. 4 illustrates a simplified block diagram of a drive system (VFD) 400 in connection with a response surface (RS) and time constant(s) in accordance with an exemplary embodiment of the present disclosure.

In general, and as described earlier, the drive system 400 comprises a power converter 410 comprising a plurality of power cells supplying power to one or more output phases, each power cell comprising multiple switching devices, a plurality of sensors 420 monitoring values of the power converter 410, and a control system 430 in communication with the power converter 410 and controlling operation of the plurality of power cells. The control system 430 is configured via computer executable instructions to access and utilize a multi-dimensional response surface and/or time constant(s) 440, for example to estimate or determine coolant flow rates and transient temperature behavior utilizing the time constant(s) for one or more components of the drive system 400.

The drive system 400 can be embodied as described with reference to FIG. 1, FIG. 2A, FIG. 2B, FIG. 2C, FIG. 3A and FIG. 3B. Specifically, when referring to sensing circuits in each power cell, such as sensing circuits 40, 40a1, 40b1, 40c1, etc., coolant flow rate(s) can be determined/provided with the described system and method, using a local processor (controller) within each power cell and sent to the main controller, such as controller 18 in FIG. 1, FIG. 2A, FIG. 2B, FIG. 2C, FIG. 3A and FIG. 3B or control system 430 in FIG. 4, for protection of each power cell and the complete drive system.

In an embodiment, drive system 400 comprises a plurality of sensors 420 to monitor various characteristics and values of the drive system 400. For example, the multiple sensors 420 include sensor for measuring and monitoring input voltage, output voltage, input current, output current of a power converter 410, internal temperatures of a transformer and/or power converter 410 and/or cooling assemblies. The sensors 420 provide feedback data, such as values and/or measurements of temperature, vibration, current and voltage via data bus to a control system, for example control system 430. The data bus can be one or more hard-wired connections with sufficient voltage isolation.

Further, the drive system 400 comprises (or has access to) one or more reduced order model(s) (ROMs), for example stored in a memory of the control system 430 or the VFD 400. Reduced order models are sophisticated models that can be used to predict accurate information regarding critical variables, such as temperature(s) inside a component or sub-assembly that processes or dissipates power while using a cooling medium such as air or water. These models use measured or estimated power through the component or power dissipation within the component and flow rate of the coolant as inputs.

In this document, the component or sub-assembly is referred to as the "device" and the device can be assembled along with other components including additional devices into a "product." The product contains software that provides functions to:

(a) monitor internal and external variables,
(b) control operation of the product, and
(c) communicate with internal and external components.

In theory, a measure of the coolant flow rate for a power cell can be obtained using differential pressure sensor(s) and/or flow sensor(s). However, these methods are prone to significant errors because of turbulence of coolant flow in the regions of interest and are also negatively impacted by the impossibility of a local measurement to provide needed average information over a surface or location of interest. In laboratory testing such measurements are possible, for e. g. by using long air tunnels, which are not practical to use in a product installed at a customer site.

Within the present disclosure, a response surface (herein referred to as shortly 'RS') concept is provided, labelled response surface 440, using several connections with the external physical world that can be called globally ins-outs. This practically means that the RS 440 is created with use of some of the input terminals (or variables) and other terminal(s) as output(s). However, when using the RS 440 in an application, such as in a drive, it is used as a look-up table (herein referred to as shortly 'LUT') with one of the aforementioned inputs as the (LUT) output and the remaining selection of inputs and the (original) output as the (LUT) inputs. In practical sense or in a practical application, an objective is to obtain a coolant flow rate, such as an air flow rate or water flow rate, that corresponds to input power and measured, not simulated, temperature.

In accordance with an exemplary embodiment of the present disclosure, the described methods and systems utilize accurate computational fluid dynamics (CFD) simulation of the device which creates a multi-dimensional RS 440 with power input and coolant flow rate input and a relevant temperature output which is also an actual measurement location of temperature inside the device.

As an alternate to the LUT representation of the RS 440, the RS 440 can be exported as a functional mock-up unit (herein also referred to as shortly 'FMU') entity and used in controller, e. g. control system 430 of drive 400, using compiled code, such as C code. This approach works well for a carefully created digital model, e. g. CFD, of the entity of interest, in this case a power cell.

The methodology of the RS 440 eliminates the inaccuracy of a direct measurement of coolant flow rate using differential pressure sensors and/or flow sensor.

Due to a dependency of measured temperature on both power and coolant flow rate, a response surface linking the three parameters can be obtained via plurality of engineering methods such as laboratory testing, engineering computations or numerical simulations. Inside the product software, the RS, for example in form of a multi-dimensional lookup table, is used in reverse using the known power and a measured temperature from a fixed location to obtain the actual coolant flow rate in a reliable fashion.

In an embodiment, numerical simulation is used to create an RS entity, for example in form of a multi-dimensional lookup table, used inside the drive system in reverse. In an example, the lookup table can be a 3-dimensional (3-D) lookup table. A 3-D lookup table entity can have a graphical representation with a selected output on the z-axis while a selected pair on inputs are on the x-axis and y-axis, respectively. However, it should be noted that the actual lookup table is a multi-dimensional entity with multiple inputs and outputs included, and an interpolation mechanism is to be used to find the output value of interest for a given combination of all available inputs. The multi-dimensional table is created with specified ranges for all used inputs; thus, extrapolation is not to be used for sake of safety of the calculated outputs. An efficient design of experiment techniques is used to minimize the computational cost of the numerical simulations which involve the sweeping of reasonable (functional) ranges for input power and coolant flow rate during simulation.

A design of experiments (DE) is created by providing relevant range(s) for the two input parameters, power, and coolant flow rate both ranging between approximately 50% and 120%. For each combination of these two input parameters, a numerical simulation is started in the background for the purpose of extracting one or more temperatures of interest being also actually measured inside the actual product. The result of these multiple simulations is to create a RS which is to be used in reverse by the product software: use power and measured temperature as inputs to obtain the air flow rate to be used by the ROM or other processes inside the product.

Examples for applications of the described systems and methods are:
  power cell with transistors/IGBTs/diodes that dissipate power on a heatsink which is cooled by airflow,
  transformer windings that dissipate power and are cooled by airflow.

Figure 5:
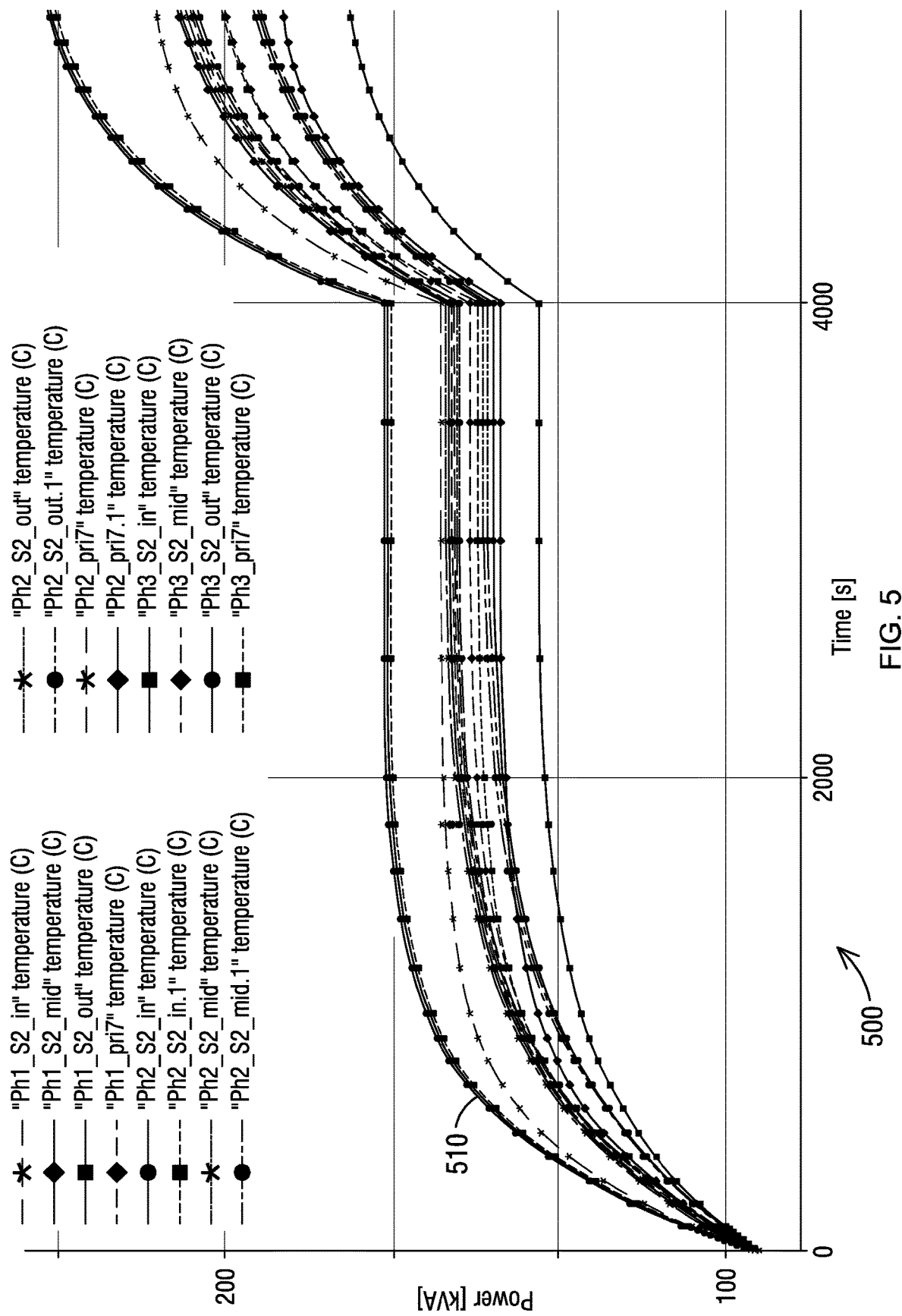
FIG. 5 illustrates a diagram including time constants in connection with transformer windings of a variable frequency drive in accordance with an exemplary embodiment of the present disclosure.

FIG. 5 illustrates a diagram including time constants in connection with transformer windings of a variable frequency drive in accordance with an exemplary embodiment of the present disclosure.

Response surface technology provides steady state values of temperature(s) inside the devices at locations of interest. In another exemplary embodiment of the present disclosure, a system and method are disclosed for determining and utilizing time constants of selected outputs for the purpose of estimating transient temperature behavior in connection with one or more devices, such as transformer windings or power cells.

A time constant, usually denoted by the Greek letter t, describes a characteristic of an exponential function, and is the time in which a physical system's response to a stepwise change in an external variable reaches approximately 63.2% of its final (asymptotic) value. More specifically, physically, in an increasing system, the time constant is the time for the system's step response to reach $1-1/e \approx 63.2\%$ of its final value. In a decreasing system, the time constant t represents the elapsed time required for the system response to decay to zero if the system had continued to decay at the initial rate. Because of the progressive change in the rate of decay, the response will have decreased in value to $1/e \approx 36.8\%$ in this time.

The diagram 500 of FIG. 5 illustrates time constants t in connection with transformer windings. The x-axis designates the time (in seconds) and the y-axis designates the charge value/apparent power (kVA) of each transformer winding. A transformer can be a multi-phase transformer comprising primary windings that excite secondary windings, wherein the power cells are operably coupled to the secondary windings.

The diagram shows the multiple transformer windings and their respective transient temperature behavior in response to a step excitation. The time constants t are extracted of selected transient waveforms 510 obtained as reaction to a step excitation, wherein the time constants t are saved and stored as part of the response surface, see 440 of FIG. 4.

Transformer windings comprises a rating and a normal operating temperature, wherein winding temperature settings must be set to temperatures that guarantee not to overheat and damage the windings. The temperature settings take into account an average ambient temperature of the transformer/drive system. For example, considering an average ambient temperature of 30° C., the transformer winding temperature setting may include a temperature rise of 80° C., which means that the transformer can operate under normal conditions up to 110° C.

In an example, a multi-phase transformer comprises a rating of 1 MVA, and the normal operating condition is up to 100° C., wherein a critical temperature may be 135° C. which is the maximum allowed temperature at which the transformer should be operated. The transformer shall be (over-) loaded from 1 MVA to 2 MVA, the temperature of the transformer being at 100° C. at the beginning of the loading process. The time constant T describes the time required for the voltage to rise approximately 0.632 (63.2%) of the difference between its old and new value, after an impulse has been applied that induces such a change, with the maximum allowed temperature being at 135° C. In our example, the time constant t describes how long it will take for the voltage to rise to appr. 63.2% of the difference between 1000 kVA and 2000 kVA (new steady state voltage), before reaching the critical temperature of 135° C.

Further, the time constants t allow an extension of the response surface methodology for a transient domain to be used in drive controllers. There are multiple ways to evaluate the time constants when analyzing the transient waveforms 510. The time constant can be determined using formulas (for example, multiply 0.632/63.2% of the new steady state voltage) or determine a derivative of the transient waveforms 510. The transient waveforms 510 originate from a separate transient analysis of the respective device, e.g., transformer windings, power cells, power cell objects (such as silicon chips), etc. The RS methodology is applicable to obtaining steady state values only, for example temperatures. These steady state values can be used with time constant data (obtained separately) in all cases where the transient aspect is of interest. In other words, the RS provides information where to start from and where to go to, while the time constant provides a time frame for the transition between the two steady states.

Figure 6:
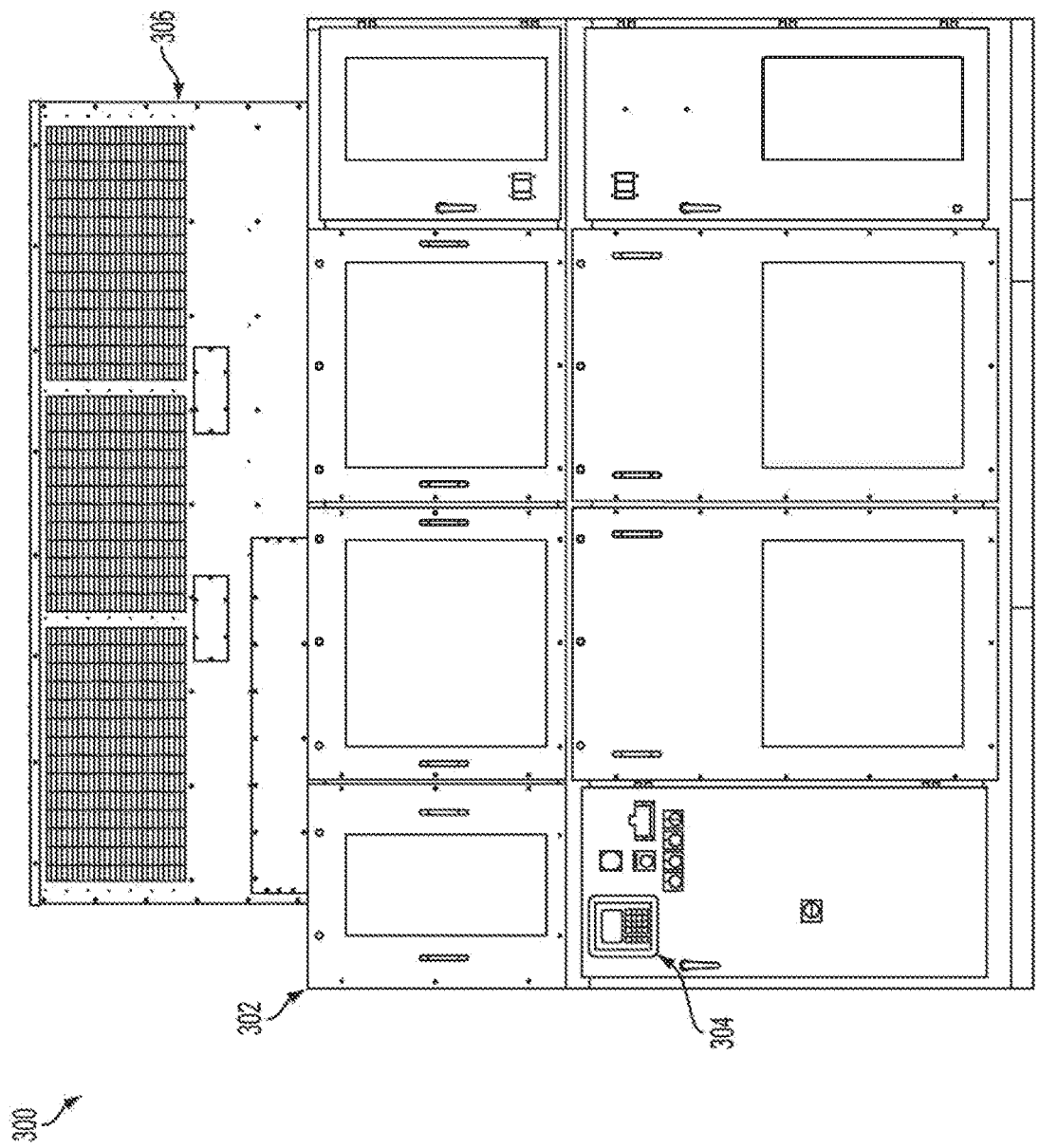
FIG. 6 illustrates an enclosure for a power supply including cooling arrangement(s)
Figure 7:
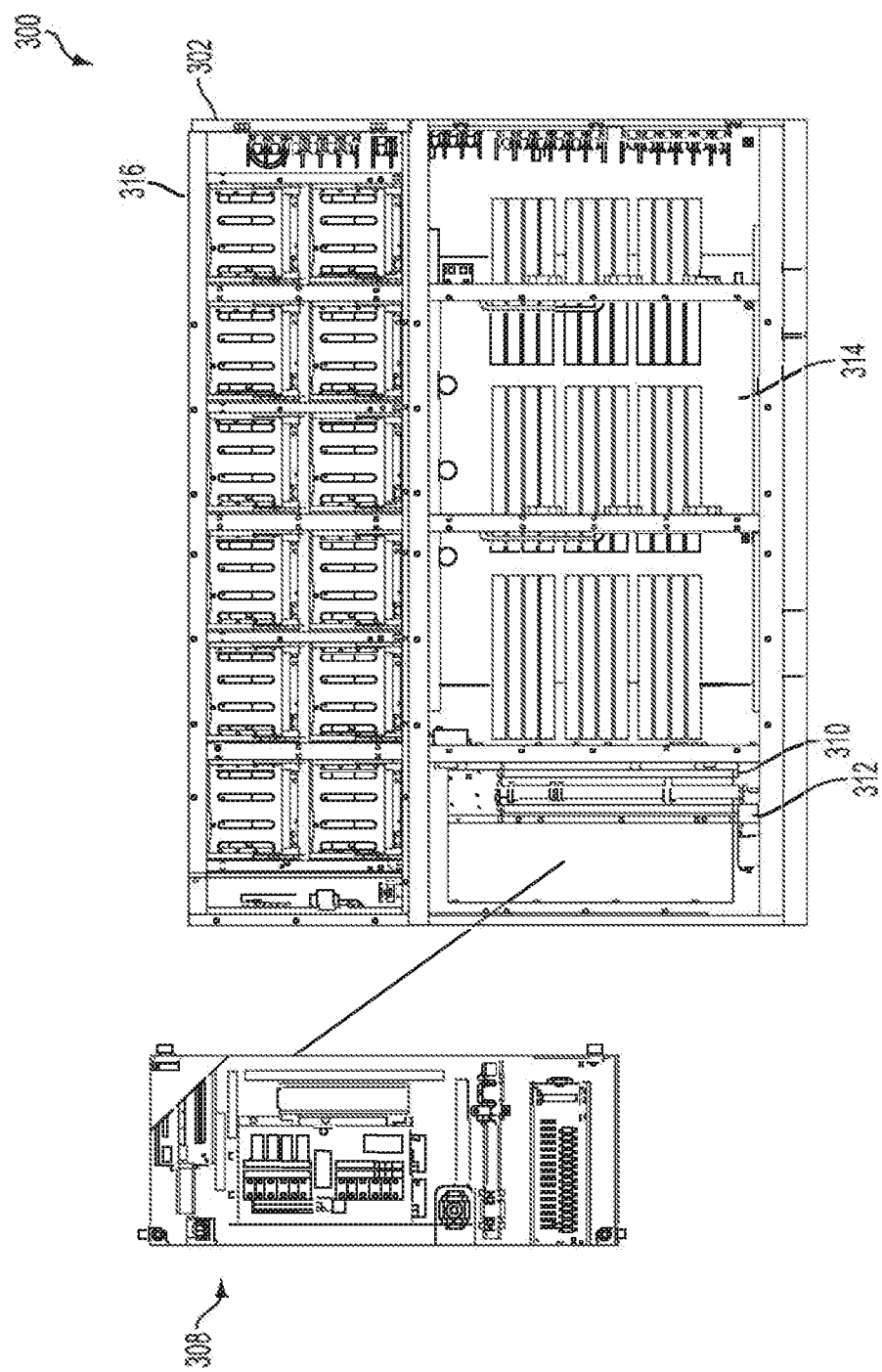
FIG. 7 illustrates the enclosure of FIG. 6 with various doors and panels removed, in accordance with exemplary embodiments of the present disclosure.

FIG. 6 illustrates an enclosure for a power supply including cooling arrangement(s), and FIG. 7 illustrates the enclosure of FIG. 6 with various doors and panels removed, in accordance with exemplary embodiments of the present disclosure.

Another example is a multi-level converter with multiple power cells that are located within a cabinet and cooled with an arrangement comprising multiple fans or blowers. Temperature sensing within each power cell becomes important for the drive because airflow through each power cell can be different due to:
  location of the power cell within the cabinet/enclosure (air-distribution is not uniform),
  number of fans in operation may change based on available redundancy in cooling.

FIG. 6 shows an illustrative power supply 300 packaged within a single-cabinet enclosure 302. The enclosure 302 may be adapted and configured to house various components of the power supply 300. The exterior of enclosure 302 may include various controls and information display devices 304 such that a customer or technician can verify operating parameters and the current operating status of the power supply 300. Additionally, multiple doors or other access means may be provided for providing access to various components contained within the enclosure 302. A blower assembly 306 may be positioned adjacent to the enclosure 302 to provide air flow for cooling various components of the power supply 300. The blower assembly 306 may be placed on the top of the enclosure 302, thereby reducing an overall footprint of the completed power supply 300 assembly.

FIG. 7 shows the power supply 300 in enclosure 302 with the various doors, access means and blower assembly 306 removed. The enclosure 302 may be arranged and configured to house the various functional components of the power supply 300 into a single cabinet.

By providing the transformer compartment 314 and the power cell compartment 316 in a vertical configuration, improved airflow through the enclosure 302 may be realized. As shown in FIG. 6 and FIG. 7, a parallel linear path may be followed from the bottom of the enclosure 302, through the transformer compartment 314 and the power cell compartment 316 via a uniform rear plenum to the blower assembly 306. This provides an efficient cooling system as a single set of blowers can provide cooling to each component of the power supply simultaneously. Depending on the operating parameters of the power supply, additional cooling such as liquid cooling, heat sinks, or other similar cooling systems may be integrated to provide additional cooling for operational components such as a transformer.

FIG. 6 and FIG. 7 show the location of the cooling fans (blower assembly 306) above the cell and transformer sections 316, 314. Typically, two out of the three fans are in operation (the $3^{rd}$ one being redundant is kept off) but depending on which two fans are in operation (left, middle or right), the airflow through the cells (power cell compartment 316 located below the fans) is different, i.e., the airflow is non-uniform through the cell section 316. Hence it is important to measure the airflow through each cell in order to ensure adequate cooling is available.

With the disclosed methods and systems, ROMs or other suitable models can be used capable of providing internal temperatures of the drive system that are not possible to measure but are critical to advanced (smart) operation. Further, implementation of sub-assemblies capable of artificial intelligence (AI) is possible.

The proposed methodology provides needed answers for a correct air flow rate in each of the power cells very fast, practically instantaneously since the process of identifying the needed value in the look-up table (or RS) is very fast. This is important, particularly in drives with many power cells to provide needed values for the drive controller in almost real time. Currently, there is no available method to evaluate the actual air flow rate in the power cells in the drive. Further, the methodology works equally well for water cooled units.

Further, the time constants t allows extension of the response surface methodology for transient domain to be used in drive controllers. The time constants are part of the response surface, and therefore time constants can be evaluated at locations without temperature sensors in the drive system.

Figure 8:
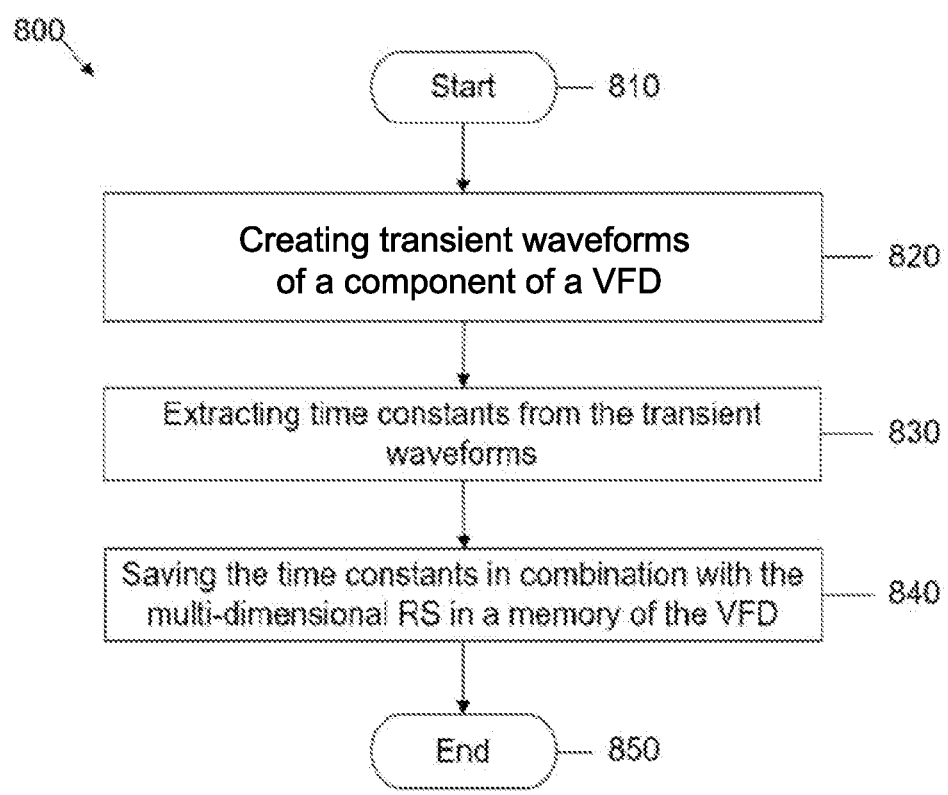
FIG. 8 illustrates a flow chart of a method for controlling a power supply in connection with a response surface (RS) in accordance with embodiments of the present disclosure.

FIG. 8 illustrates a flow chart of a method 800 for determining and utilizing a time constant in connection with a response surface (RS) in accordance with embodiments of the present disclosure.

While the method 800 is described as a series of acts or steps that are performed in a sequence, it is to be understood that the method 800 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 800 may start at 810 and comprises an act 820 of creating transient waveforms of a device of a VFD, an act 830 of extracting a time constant from the transient waveforms, and act 840 of saving the time constant in combination with the multi-dimensional RS in a memory of a VFD. At 850, the method 800 may end.

It should be appreciated that acts associated with the above-described methodologies, features, and functions (other than any described manual acts) may be carried out by one or more data processing systems, via operation of at least one processor. As used herein, a processor corresponds to any electronic device that is configured via hardware circuits, software, and/or firmware to process data. For example, processors described herein may correspond to one or more (or a combination) of microprocessor, CPU, or any other integrated circuit (IC) or other type of circuit that is capable of processing data in a data processing system. The at least one processor that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

The invention claimed is:

1. A variable frequency drive system comprising:
   a power converter comprising a plurality of power cells supplying power to one or more output phases, each power cell comprising multiple switching devices,
   a plurality of sensors monitoring values of the power converter, and
   a control system in communication with the power converter and controlling operation of the plurality of power cells, and
   a memory storing one or more time constant(s),
   wherein the control system is configured via computer executable instructions to determine transient temperature behavior utilizing the time constant(s).

2. The variable frequency drive system of claim 1, wherein the multiple switching devices of each power cell comprises insulated-gate bipolar transistors (IGBTs) and diodes, wherein the control system is configured to determine the transient temperature behavior of the IGBTs and/or diodes utilizing the time constant(s).

3. The variable frequency drive system of claim 1, further comprising:
   a transformer comprising windings, wherein the control system is configured to determine transient temperature behavior of the transformer windings utilizing the time constant(s).

4. The variable frequency drive of claim 1,
   wherein the time constants are elements of a multi-dimensional response surface (RS) stored in the memory, and
   wherein the control system is configured to access and utilize the multi-dimensional response surface (RS) to obtain an internal coolant flow rate.

5. The variable frequency drive of claim 4,
   wherein the internal coolant flow rate is an internal air flow rate.

6. The variable frequency drive of claim 4,
   wherein the multi-dimensional response surface is designed as a multi-dimensional lookup table.

7. The variable frequency drive of claim 6,
wherein input values for the multi-dimensional lookup table include power and measured internal temperature, and an output value is the internal coolant flow rate.

8. The variable frequency drive of claim 4,
wherein the multi-dimensional response surface is designed as a functional mock-up unit (FMU) including compiled code.

9. The variable frequency drive of claim 4,
wherein the multi-dimensional response surface is created using computational fluid dynamics (CFD) simulation of one or more selected device(s).

10. The variable frequency drive of claim 9,
wherein the CFD simulation uses power input and coolant flow rate input and a relevant temperature output which is also an actual measurement location of temperature inside the one or more selected device(s).

11. A method for determining and utilizing a time constant in connection with a variable frequency drive (VFD), the method comprising, through operation of at least one processor:
creating transient waveforms of a device of a VFD,
extracting a time constant from the transient waveforms,
saving the time constant and the multi-dimensional RS in a memory of the VFD.

12. The method of claim 11, further comprising:
accessing and utilizing, by a control system, the time constant stored in the memory to determine transient temperature behavior of the device.

13. The method of claim 11, further comprising:
determining the transient temperature behavior of switching devices of a power cell utilizing the time constant, the switching devices comprising insulated-gate bipolar transistors (IGBTs) and diodes.

14. The method of claim 11, further comprising:
determining the transient temperature behavior of transformer windings utilizing the time constant.

15. The method of claim 14,
wherein the transient temperature behavior of the transformer windings is determined for a loading process of the transformer.

16. The method of claim 11,
wherein the control system is configured to access and utilize the multi-dimensional response surface (RS) to obtain an internal coolant flow rate.

17. The method of claim 11,
wherein the multi-dimensional RS is designed as a multi-dimensional lookup table.

18. The method of claim 11,
wherein the multi-dimensional RS is designed as a functional mock-up unit (FMU) including compiled code, wherein input values for the multi-dimensional lookup table include power and measured internal temperature, and an output value is the internal coolant flow rate.

19. The method of claim 11, further comprising:
creating the multi-dimensional RS using computational fluid dynamics (CFD) simulation of one or more selected device(s).

20. The method of claim 19,
wherein the CFD simulation uses power input and coolant flow rate input and a relevant temperature output which is also an actual measurement location of temperature inside the one or more selected device(s).

* * * * *